United States Patent
Ha et al.

(10) Patent No.: US 12,536,462 B2
(45) Date of Patent: Jan. 27, 2026

(54) METHOD AND APPARATUS FOR DETERMINING RECOVERY OPERATOR USING TOPOLOGICAL STRUCTURE OF ROTATED SURFACE CODE

(71) Applicant: Korea Advanced Institute of Science and Technology, Daejeon (KR)

(72) Inventors: Jeongseok Ha, Daejeon (KR); Hyunwoo Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 110 days.

(21) Appl. No.: 18/525,914

(22) Filed: Dec. 1, 2023

(65) Prior Publication Data
US 2025/0021858 A1     Jan. 16, 2025

(30) Foreign Application Priority Data
Jul. 13, 2023   (KR) .................. 10-2023-0090819

(51) Int. Cl.
*G06N 10/70*     (2022.01)
(52) U.S. Cl.
CPC .................. *G06N 10/70* (2022.01)
(58) Field of Classification Search
CPC ........ G06N 10/70; G06N 10/40; G06N 10/60; B82Y 10/00

USPC ......................................................... 714/746
See application file for complete search history.

(56) References Cited

U.S. PATENT DOCUMENTS

| | | | | |
|---|---|---|---|---|
| 9,130,598 | B2* | 9/2015 | Goto ..................... | G06N 10/70 |
| 10,922,166 | B2* | 2/2021 | Hogaboam ............ | G06N 10/60 |
| 11,715,026 | B2* | 8/2023 | Oliver ................... | G06N 10/70 |
| | | | | 714/47.1 |
| 11,972,179 | B2* | 4/2024 | Baek ..................... | G06N 10/20 |
| 2020/0242208 | A1* | 7/2020 | Daraeizadeh ....... | G06F 11/1068 |
| 2021/0182234 | A1* | 6/2021 | Beigi .................... | G06F 15/82 |
| 2021/0334688 | A1* | 10/2021 | Delfosse .............. | G06N 10/40 |
| 2023/0177373 | A1* | 6/2023 | Gidney ............... | G11C 11/4063 |
| | | | | 706/62 |
| 2024/0127094 | A1* | 4/2024 | On ........................ | G06N 10/00 |

* cited by examiner

*Primary Examiner* — James C Kerveros
(74) *Attorney, Agent, or Firm* — NKL Law; Jae Youn Kim

(57) ABSTRACT

The present disclosure relates to a method for determining a recovery operator using a topological structure of a rotated surface code. a reliability of n qubits (n being an integer of 1 or more) included in the rotated surface code is determined by using a belief propagation decoding algorithm. at least one subset for the n qubits is set based on the reliability of the n qubits. the recovery operator is determined by using the at least one subset.

15 Claims, 11 Drawing Sheets

METHOD AND APPARATUS FOR DETERMINING RECOVERY OPERATOR USING TOPOLOGICAL STRUCTURE OF ROTATED SURFACE CODE

This study relates to the Fundamental Research on Quantum Computing for Artificial Intelligence (No. 1711193112) according to a research project conducted with the support of the Information and Communication Planning and Evaluation Institute with funding from the Ministry of Science and ICT (Government) in 2023.

In addition, this study relates to the Signal Processing and Error Correction Techniques for Data-centric Computing (No. 1711188359) according to a research project conducted with the support of the National Research Foundation of Korea with funding from the Ministry of Science and ICT (Government) in 2022 and 2023.

TECHNICAL FIELD

The present disclosure relates to a method and apparatus for determining a recovery operator using a topological structure of rotated surface code.

BACKGROUND

In order for a quantum computer to perform reliable information processing, quantum error correction codes used to determine and correct errors in qubits are essential. Thereamong, topological quantum error correction code is attracting attention, and the performance of the code can be improved using an appropriate decoding algorithm.

The stabilizer code, one type of quantum error correction code, is defined as the stabilizer group S, which is an Abelian subgroup of the Pauli group, and the code space C can be represented by the following mathematical expression 1.

$$C = \{|\psi\rangle | S|\psi\rangle = |\psi\rangle \text{ for all } S \in \mathcal{S}\} \qquad \text{[Mathematical expression 1]}$$

Stabilizer operators S are used to extract a syndrome for determining errors generated in qubits, and the qubits used in this case need to be physically located close to each other. A code that reflects these properties is a topological quantum error correction code.

Rotated surface codes $[\![n, k, d]\!]$ are one type of topological quantum error correction codes and form a lattice structure as shown in FIG. 1. There are two types of stabilizer operators for surface codes and they are defined as represented by the following mathematical expression 2.

$$X_{f_r} := \prod_{v \in f_r} X_v, \quad Z_{f_b} := \prod_{v \in f_b} Z_v \qquad \text{[Mathematical expression 2]}$$

Here, $f_r$ and $f_b$ indicate a first plane 101 and a second plane 102, $X_v$ indicates an operator for performing an X operation on a qubit disposed at a vertex vector v, and $Z_v$ indicates an operator for performing an Z operation on the qubit disposed at the vertex vector v.

In addition, a minimum distance d of the surface code is $\sqrt{n}$, and the surface code can successfully correct errors generated in $\left\lfloor \frac{d-1}{2} \right\rfloor$ or less qubits.

A surface code decoding algorithm is a process of detecting and correcting errors E generated in qubits. First, measurement needs to be performed in order to determine errors generated in qubits, but if direct measurement is performed on the qubits, information contained therein is lost.

Therefore, a syndrome extraction circuit is used to determine errors without losing the information contained in qubits. The result obtained through this is called syndrome $\vec{s}$, and the decoding algorithm determines what kind of error has occurred based on the syndrome and determines a recovery operator R to be used for error correction. Unlike conventional error correction codes, quantum error correction codes have the property of degeneracy, and decoding is successfully performed if the condition of the following mathematical expression 3 is satisfied.

$$ER = S \text{ for any } S \in \mathcal{S} \qquad \text{[Mathematical expression 3]}$$

Here, E denotes the error operator, R denotes the recovery operator, and S denotes the stabilizer operator.

That is, unlike conventional error correction code where the error operator and recovery operator must be the same, decoding is successfully performed if only the logical states of the two operators are the same.

Meanwhile, a representative surface code decoding algorithm includes a belief propagation decoding algorithm used for existing error correction codes. However, the belief propagation decoding algorithm has a limitation in that it is not suitable for rotated surface codes in which various error patterns are formed.

Therefore, there is a need for development of a method of successfully decoding surface codes through post-processing of the belief propagation decoding algorithm.

SUMMARY

An object of the present disclosure is to provide a method of determining a recovery operator by distinguishing between a fix set, which is a set of qubits, for which a result of the belief propagation decoding algorithm is used as it is and a reset set which is reset to correspond to a syndrome without using a result of the belief propagation decoding algorithm by using the topological structure of a rotated surface code in order to realize successful surface code decoding through post-processing of the belief propagation decoding algorithm.

However, the objects of the present disclosure is not limited to the aforementioned object, and other objects not mentioned may be clearly understood by those of ordinary skill in the art to which the present disclosure belongs from the following description.

In accordance with one aspect of the present disclosure, there is provided a method of determining a recovery operator using a topological structure of a rotated surface code, the method comprising: determining a reliability of n qubits (n being an integer of 1 or more) included in the rotated surface code using a belief propagation decoding algorithm; setting at least one subset for the n qubits based on the reliability of the n qubits; and determining the recovery operator using the at least one subset.

Preferably, the determining the reliability of the n qubits includes determining the reliability based on a log-likelihood ratio derived through the belief propagation decoding algorithm.

Preferably, the setting the at least one subset includes: setting a fix set for k qubits (k being in integer of 1 or more and less than n) in an ascending order of values derived through computations on the reliability of the n qubits; and setting a reset set for n–k qubits not included in the fix set.

Preferably, the setting the fix set has setting the fix set such that recovery operators determined from the n–k qubits included in the reset set have the same logical state with reference to the topological structure of the surface code.

Preferably, the determining the recovery operator has determining the recovery operator based on the log-likelihood ratio derived for the k qubits in the case of the fix set.

Preferably, the determining the recovery operator has determining a recovery operator corresponding to a syndrome using a pure error determined for the n–k qubits in the case of the reset set.

In accordance with another aspect of the present disclosure, there is provided a non-transitory non-transitory computer-readable storage medium storing a computer program, the computer program including instructions causing a processor to perform, when executed by the processor, a method of determining a recovery operator using a topological structure of a rotated surface code, the method comprising: determining a reliability of n qubits (n being an integer of 1 or more) included in the rotated surface code using a belief propagation decoding algorithm; setting at least one subset for the n qubits based on the reliability of the n qubits; and determining the recovery operator using the at least one subset.

In accordance with a still another aspect of the present disclosure, there is provided an apparatus for determining a recovery operator using a topological structure of a rotated surface code, the apparatus comprising: a memory in which a recovery operator determination program is stored; and a processor configured to load the recovery operator determination program from the memory and to execute the recovery operator determination program, wherein the processor is configured to: determine a reliability of n qubits (n being an integer of 1 or more) included in the rotated surface code using a belief propagation decoding algorithm; set at least one subset for the n qubits based on the reliability of the n qubits; and determine the recovery operator using the at least one subset.

According to an embodiment of the present disclosure, it is possible to achieve a logical error rate corresponding to a maximum likelihood algorithm, which is the optimal decoding algorithm, by determining a recovery operator using the degeneracy property and topological lattice structure of the quantum error correction code.

In addition, according to an embodiment of the present disclosure, it is possible to significantly reduce computational complexity compared to conventional error correction code decoding which requires determination of a unique recovery operator because qubits included in the surface code are divided into a fix set and a reset set, and it is required that only the condition that recovery operators corresponding to the syndrome determined using the qubits included in the reset set need not be unique and the local states of the recovery operators are the same is satisfied.

However, effects of the present disclosure are not limited to the effects mentioned above, and other effects not mentioned will be clearly understood by those skilled in the art from the description below.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 2:
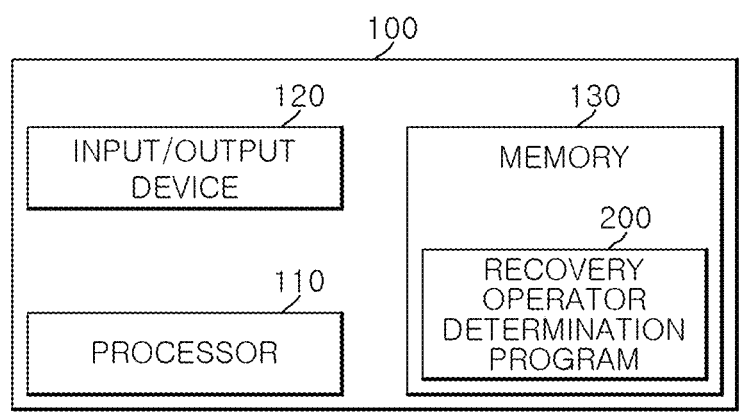
FIG. 2 is a block diagram illustrating a recovery operator determination apparatus according to an embodiment of the present disclosure.

FIG. 2 is a block diagram illustrating a recovery operator determination apparatus according to an embodiment of the present disclosure.

Referring to FIG. 2, the recovery operator determination apparatus 100 may include a processor 110, an input/output device 120, and a memory 130.

The processor 110 may generally control the operation of the recovery operator determination apparatus 100.

The processor 110 can receive a rotated surface code as input using the input/output device 120.

Figure 1:
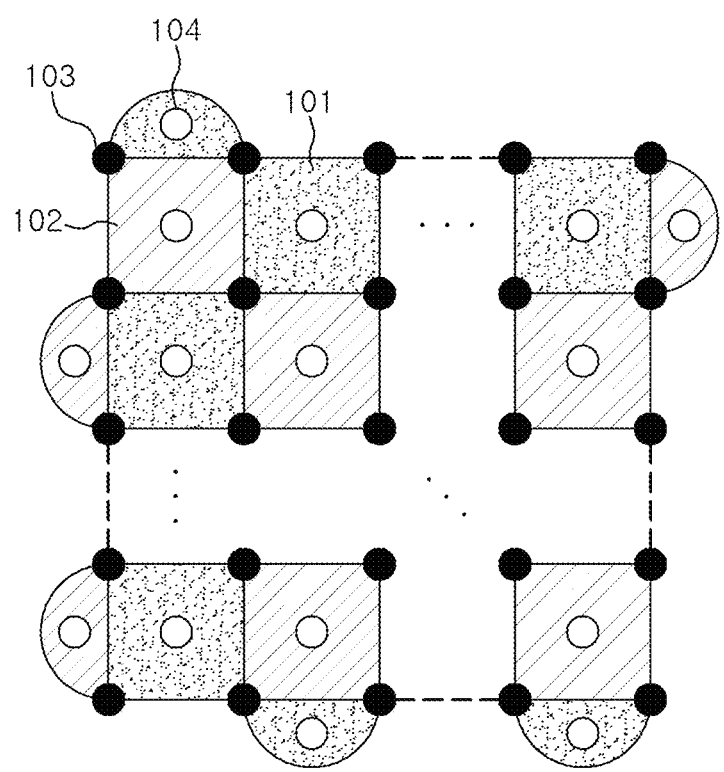
FIG. 1 is a diagram illustrating a lattice structure of rotated surface code according to an embodiment of the present disclosure.

In the present disclosure, the rotated surface code is a type of topological stabilizer code among quantum error correction codes and can form a lattice structure as shown in FIG. 1.

Although the rotated surface code is described as being input through the input/output device 120 in the present disclosure, the present disclosure is not limited to this. That is, according to an embodiment, the recovery operator determination apparatus 100 may include a transceiver (not shown) and may obtain a rotated surface code using the transceiver (not shown). The rotated surface code may be generated in the recovery operator determination apparatus 100.

The processor 110 may determine the reliability of n qubits (n being an integer of 1 or more) included in the surface code using the belief propagation decoding algorithm, set at least one subset for the n qubits based on the reliability of the n qubits, and determine the recovery operator using the at least one subset.

The input/output device 120 may include one or more input devices and/or one or more output devices. For example, input devices may include a microphone, a keyboard, a mouse, a touch screen, and the like, and output devices may include a display, a speaker, and the like.

The memory 130 may store the recovery operator determination program 200 and information necessary for execution of the recovery operator determination program 200.

In this specification, the recovery operator determination program 200 may refer to software that receives a rotated surface code and includes instructions for determining a recovery operator.

In order to execute the recovery operator determination program 200, the processor 110 may load the recovery operator determination program 200 and information necessary for execution of the recovery operator determination program 200 from the memory 130.

The processor 110 may execute the recovery operator determination program 200 to determine the reliability of n qubits (n being an integer of 1 or more) included in the surface code through the belief propagation decoding algorithm, set at least one subset for the n qubits based on the reliability of the n qubits, and determine the recovery operator using the at least one subset.

The function and/or operation of the recovery operator determination program 200 will be described in detail with reference to FIG. 3.

Figure 3:
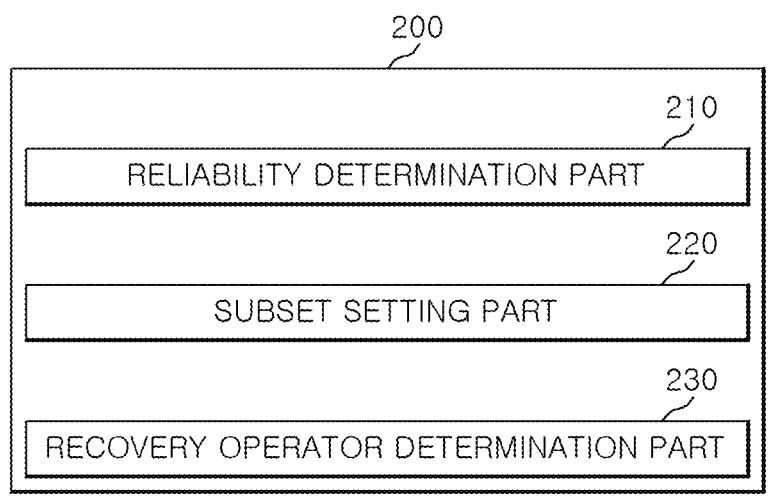
FIG. 3 is a block diagram conceptually illustrating the functions of a recovery operator determination program according to an embodiment of the present disclosure.

FIG. 3 is a block diagram conceptually illustrating the functions of the recovery operator determination program according to an embodiment of the present disclosure.

Referring to FIG. 3, the recovery operator determination program 200 may include a reliability determination part 210, a subset setting part 220, and a recovery operator determination part 230.

The reliability determination part 210, the subset setting part 220, and the recovery operator determination part 230 shown in FIG. 3 are obtained by conceptually dividing the recovery operator determination program 200 in order to easily described the functions of the recovery operator determination program 200, and the present disclosure is not limited thereto. According to an embodiment, the functions of the reliability determination part 210, the subset setting part 220, and the recovery operator determination part 230 may be merged/separated and may be implemented as a series of instructions included in one program.

First, the reliability determination part 210 can determine the reliability of n qubits (n being an integer of 1 or more) included in the surface code using the belief propagation decoding algorithm.

Here, the belief propagation algorithm may refer to an algorithm for estimating the distribution of random variables corresponding to other nodes when a probability distribution or value for some nodes in a graphic model is given, and the reliability determination part 210 may determine the reliability (or probability information) of each qubit by estimating a probability distribution corresponding to qubits other than a specific qubit when a probability distribution or value for the specific qubit corresponding to a node is given in the lattice structure of the rotated surface code through the belief propagation decoding algorithm.

Specifically, the reliability determination part 210 may determine the reliability of n qubits included in the rotated surface code based on a log-likelihood ratio derived through the belief propagation decoding algorithm.

More specifically, the reliability of a qubit can be represented by the following mathematical expression 4.

$$(Rel)_i = \max \{p_I, p_X, p_Y, p_Z\} \quad \text{[Mathematical expression 4]}$$

$$I = \begin{pmatrix} 1 & 0 \\ 0 & 1 \end{pmatrix}$$

$$X = \begin{pmatrix} 0 & 1 \\ 1 & 0 \end{pmatrix}$$

$$Y = \begin{pmatrix} 0 & 1 \\ -1 & 0 \end{pmatrix}$$

$$Z = \begin{pmatrix} 1 & 0 \\ 0 & -1 \end{pmatrix}$$

Here, $(Rel)_i$ denotes the reliability of an i-th qubit, $p_I$, $p_X$, $p_Y$ and $p_Z$ denote the probabilities of a qubit computed based on the log-likelihood ratio being logical operators I, X, Y, and Z, and I, X, Y, and Z denote logical operators as Pauli operators.

Next, the subset setting part 220 may set at least one subset for the n qubits based on the reliability of the n qubits.

Specifically, the subset setting part 220 may set a fix set for k qubits (k being an integer of 1 or more and less than n) in an ascending order of values derived through computations on the reliability of the n qubits. Additionally, the subset setting part 220 may set a reset set for n−k qubits which are not included in the fix set.

For example, the subset setting part 220 may set a fix set (e.g., Bohr set) for k qubits with the lowest product of qubit reliability, and the fix set may be represented by the following mathematical expression 5.

$$\hat{C} = \arg\max \left( \prod_{i \in C} (Rel)_i \right) \quad \text{[Mathematical expression 5]}$$

Here, $\hat{C}$ denotes the Bohr set for k qubits with the lowest product of the reliability of the i-th qubit, and $(Rel)_i$ denotes the reliability of the i-th qubit.

Here, since the recovery operator needs to be unique, the number of qubits with low reliability which are reset needs to be equal to the number of syndromes and be independent.

Meanwhile, many operations are required to set the fix set (e.g., a Bohr set), which may cause high computational complexity. In this case, the subset setting part 220 may set a fix set such that the logical states of recovery operators determined from n−k qubits included in the reset set are identical with reference to the topological structure of the surface code.

Specifically, recovery operators corresponding to syndromes created using the qubits included in the reset set do not need to be unique and only need to satisfy the condition that the logical states thereof are identical. That is, the number of remaining qubits does not need to match the number of syndromes and does not need to be independent, and thus the process of finding a Bohr set, which accounts for most of the computational complexity, can be replaced.

Here, the condition that the logical states determined with reference to the topological structure of the surface code are identical will be described in detail later with reference to FIGS. 5 to 9.

Next, the recovery operator determination part 230 may determine a recovery operator using the at least one subset.

Specifically, in the case of the fix set, the recovery operator determination part 230 may determine a recovery operator based on a log-likelihood ratio derived for k qubits.

In other words, the recovery operator determination part 230 can determine a recovery operator for the k qubits included in the fix set by using the result of the belief propagation decoding algorithm as it is.

Additionally, in the case of the reset set, the recovery operator determination part 230 may determine a recovery operator corresponding to a syndrome using a pure error determined for n−k qubits.

Here, a pure error may mean an error operator corresponding to a syndrome in which only the i-th value is 1 and the rest are 0, and the error operator may be stored in a lookup table.

In other words, the recovery operator determination part 230 may determine a recovery operator corresponding to a syndrome by referring to error operators stored in the lookup table.

Figure 4:
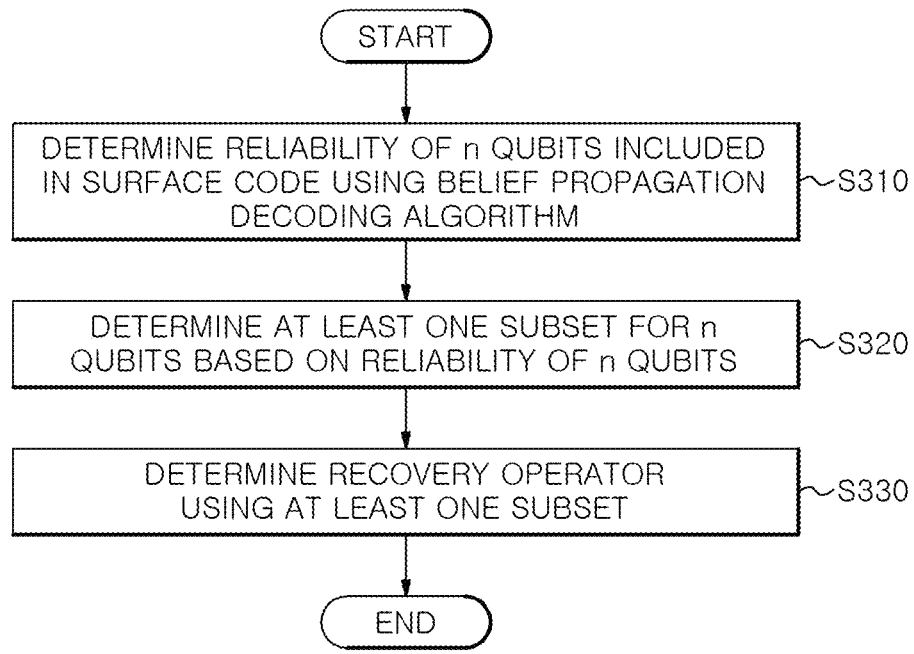
FIG. 4 is a flowchart illustrating a method of determining a recovery operator according to an embodiment of the present disclosure.

FIG. 4 is a flowchart illustrating a method of determining a recovery operator according to an embodiment of the present disclosure.

Referring to FIGS. 3 and 4, the reliability determination part 210 may determine the reliability of n qubits (n being an integer of 1 or more) included in a surface code using the belief propagation decoding algorithm (S310).

Next, the subset setting part 220 may determine at least one subset for the n qubits based on the reliability of the n qubits (S320).

Here, the subset setting part 220 may set a fix set for k qubits (k being an integer of 1 or more and less than n) in an ascending order of values derived through computations on the reliability of the n qubits and set a reset set for n−k qubits that are not included in the fix set.

Next, the recovery operator determination part 230 may determine a recovery operator using at least one subset (S330). That is, the recovery operator determination part 230 may determine a recovery operator using at least one of the fix set or the reset set.

Figure 5:
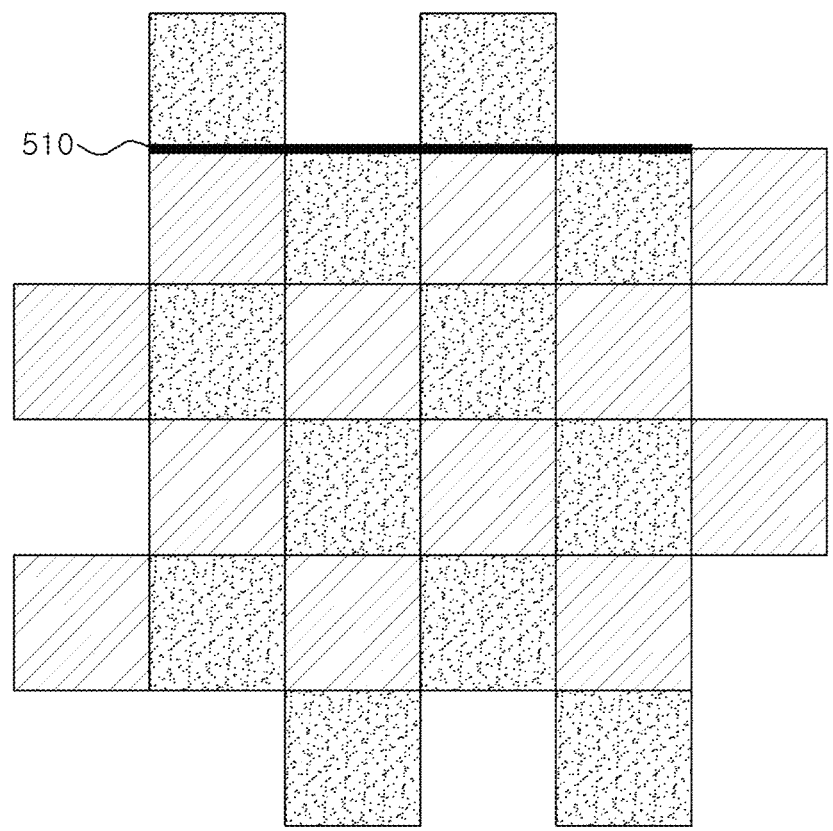
FIGS. 5 to 7 are diagrams illustrating setting of a fix set and a reset set in relation to a logical operator Z.
Figure 6:
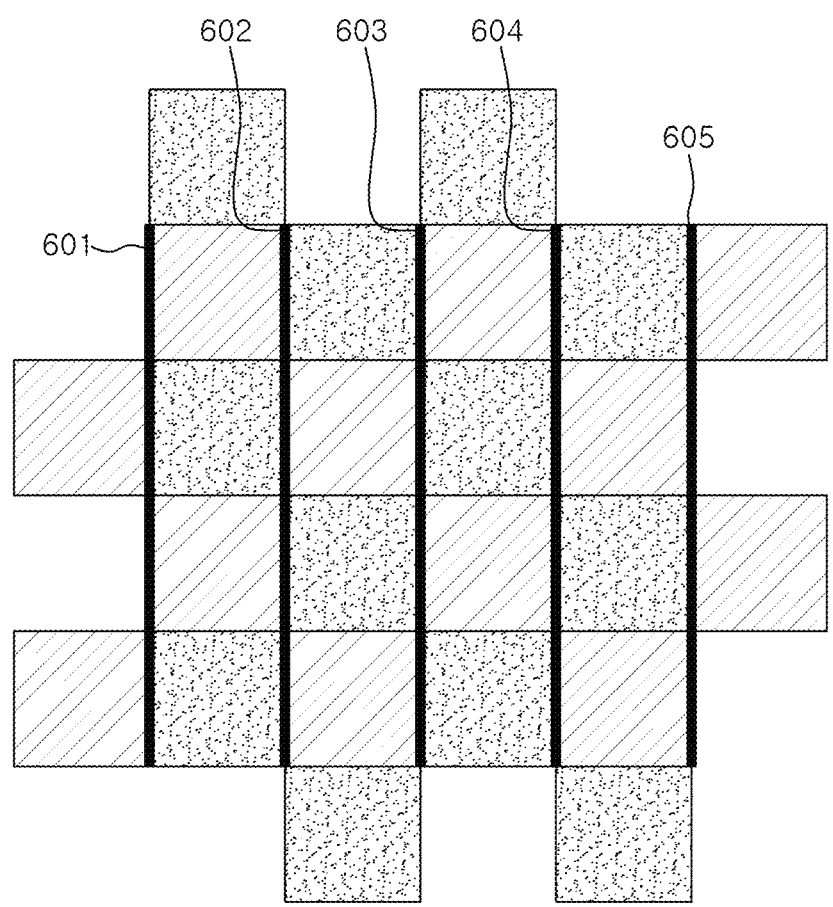
Figure 7:
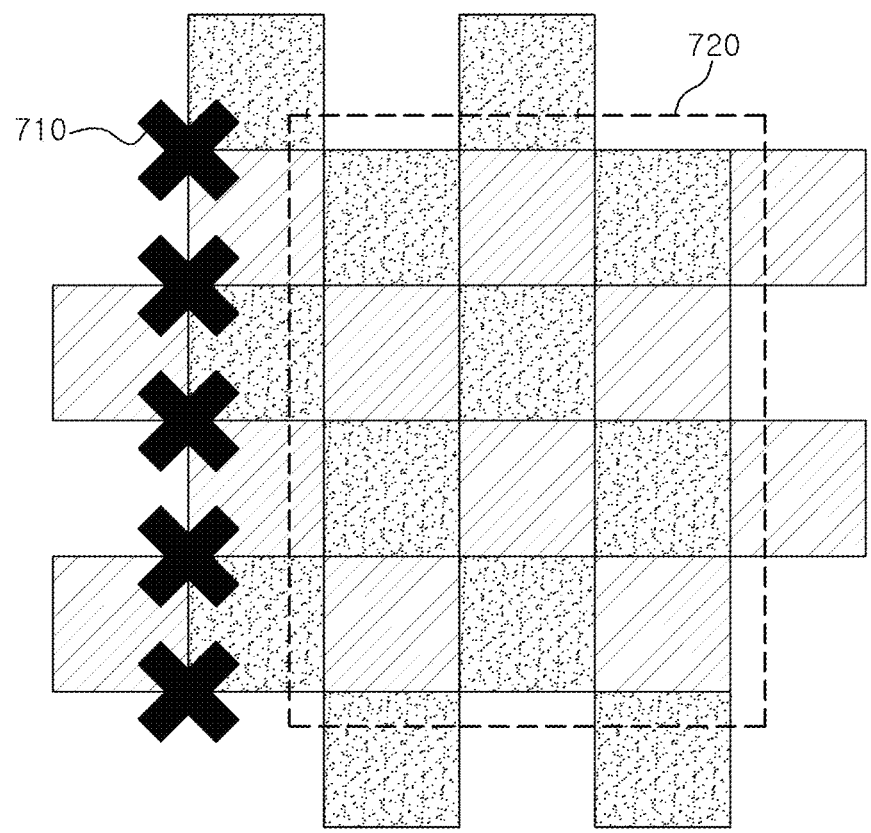

FIGS. 5 to 7 are diagrams illustrating setting of a fix set and a reset set in relation to the logical operator Z.

FIGS. 5 to 7 show a lattice structure of a rotated surface code and the logical operator Z.

Referring to FIG. 5, the horizontal segment 510 may mean one logical operator Z of the rotated surface code, and operators having the same logical state as the logical operator Z may mean operators obtained by multiplying the logical operator Z by stabilizers.

Here, operators having the same logical state as logical operator Z have a topological structure starting with one of the leftmost qubits and ending with one of the rightmost qubits.

In other words, referring to FIG. 6, the operators have a topological structure starting with one of the qubits included in the first vertical segment 601, passing through the qubits included in the second vertical segment 602 to the fourth vertical segment 604, and ending with one of the qubits included in the fifth vertical segment 605, and when one of the first to fifth vertical segments 601 to 605 is fixed, the logical operator Z cannot be created using the remaining qubits.

For example, referring to FIGS. 3, 6, and 7, when qubits 710 included in the first vertical segment 601 are fixed, all operators created using qubits included in a box 720 have the same logical state. Accordingly, the subset setting part 220 may set a fix set for the fixed qubits 710 as represented by the following mathematical expression 6, and when the fix set is set, set a reset set for the remaining qubits 720.

$$C = \arg\max \left( \prod_{i \in C_j} (Rel)_i \right) \quad \text{[Mathematical expression 6]}$$

Here, C denotes a fix set, $C_j$ denotes a set of qubits included in the first vertical component 601 to the fifth vertical component 605, and $(Rel)_i$ denotes the reliability of the i-th qubit.

Figure 8:
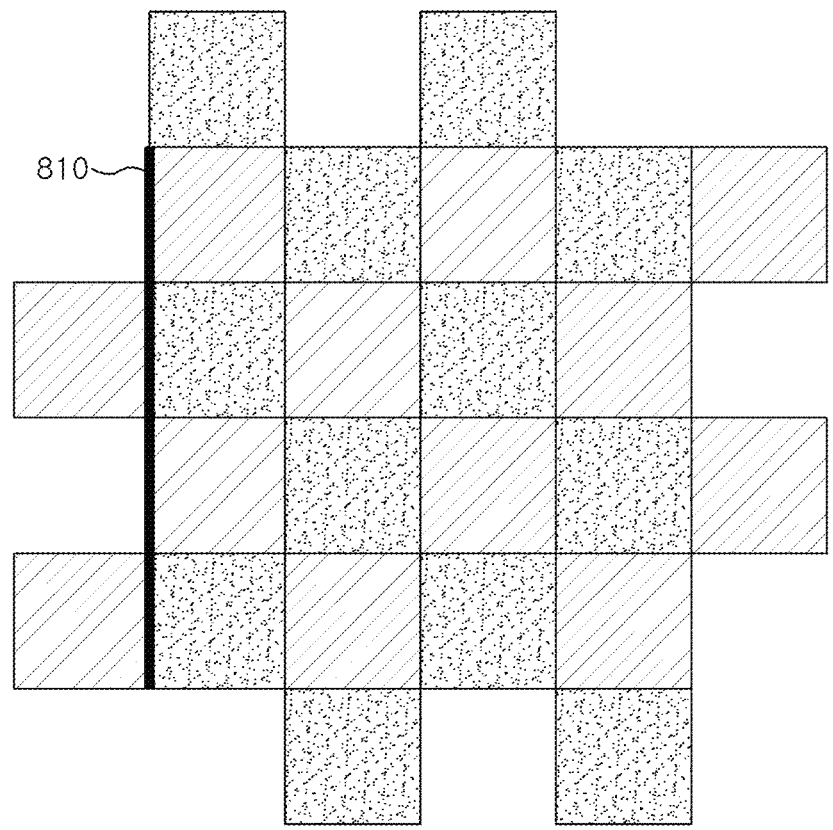
FIGS. 8 and 9 are diagrams illustrating setting of a fix set and a reset set in relation to a logical operator X.
Figure 9:
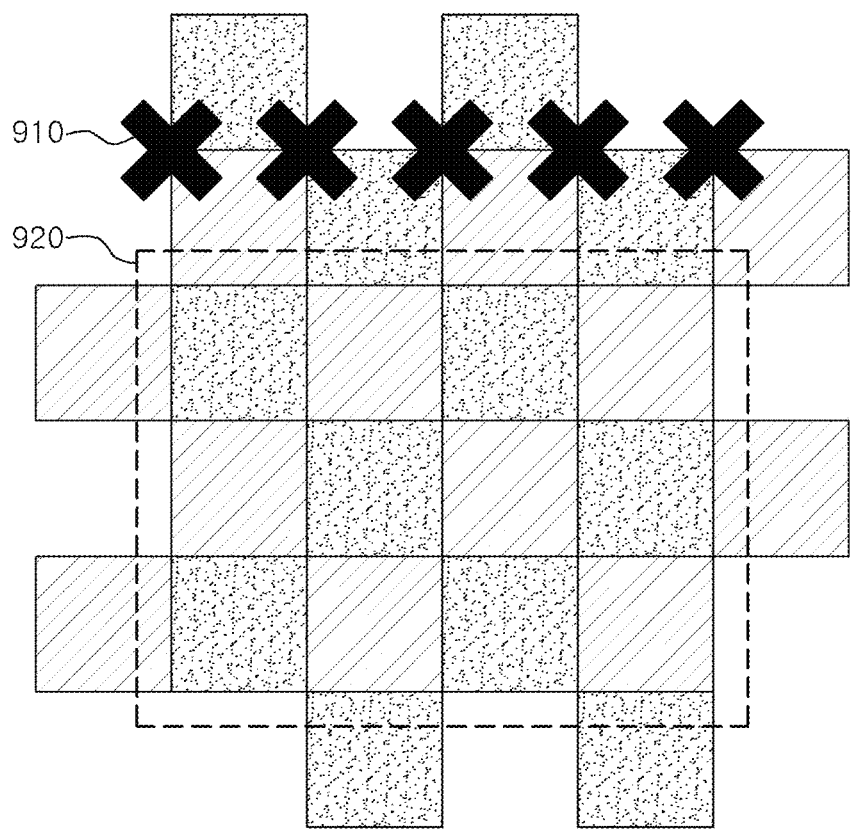

FIGS. 8 and 9 are diagrams illustrating setting of a fix set and a reset set in relation to the logical operator X.

FIGS. 8 and 9 show the lattice structure of the rotated surface code and the logical operator X.

Referring to FIG. 8, the vertical segment 810 may mean one logical operator X of the rotated surface code, and operators having the same logical state as the logical operator X have a topological structure starting with one of the uppermost qubits and ending with one of the lowermost qubits.

In other words, similar to FIG. 6, the operators have a topological structure starting with one of the qubits included in the first horizontal segment, passing through the qubits included in the second to fourth horizontal segments, and ending with one of the qubits included in the fifth horizontal segment, and when one of the first to fifth horizontal segments is fixed, the logical operator X cannot be created using the remaining qubits.

Specifically, referring to FIGS. 3 and 9, when qubits 910 included in the first horizontal segment are fixed, all operators created using qubits included in a box 920 that does not include the first horizontal segment have the same logical state. Accordingly, the subset setting part 220 can set a fix set for the fixed qubits 910 and set a reset set for the remaining qubits 920.

Figure 10:
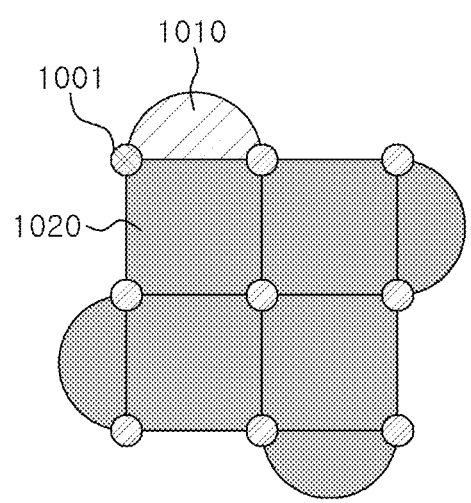
FIGS. 10 and 11 are diagrams illustrating determination of a recovery operator corresponding to a syndrome using a pure error in the case of a reset set.
Figure 11:
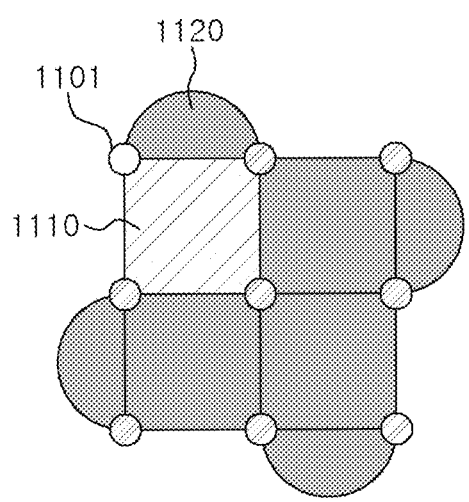

FIGS. 10 and 11 are diagrams illustrating determination of a recovery operator corresponding to a syndrome using a pure error in the case of a reset set.

FIGS. 10 and 11 show two pure errors in a rotated surface code.

First, referring to FIGS. 3 and 10, the first plane 1010 and the second plane 1020 mean that the values of a syndrome extracted by each stabilizer are 1 and 0, the first qubit 1001 has a Z error, and the recovery operator determination part 230 may determine a recovery operator corresponding to the syndrome using Z errors stored in a lookup table.

Referring to FIGS. 3 and 11, the first plane 1110 and the second plane 1120 mean that the values of a syndrome extracted by each stabilizer are 1 and 0, and the second qubit 1101 has an X error, and the recovery operator determination part 230 may determine a recovery operator corresponding to the syndrome using X errors stored in the lookup table.

Combinations of each block of the block diagrams and each step of the flowchart attached to the present disclosure may be performed by computer program instructions. Since these computer program instructions can be installed in an encoding processor of a general-purpose computer, a special-purpose computer, or other programmable data processing equipment, the instructions executed through the encoding processor of the computer or other programmable data processing equipment generate means for executing functions described in each block of the block diagrams or each step of the flowchart. These computer program instructions may also be stored in a computer-usable or computer-readable memory that can be directed to computers or other programmable data processing equipment to implement functions in a particular way, and thus the instructions stored in the computer-usable or computer-readable memory can also produce manufactured items containing instruction means for executing the functions described in each block of the block diagram or each step of the flowchart. Since the computer program instructions can also be installed in a computer or other programmable data processing equipment, a series of operational steps may be performed on the computer or other programmable data processing equipment to create a process that is executed by the computer, thereby providing steps for executing the functions described in each block of the block diagrams and each step of the flowchart through the instructions.

Additionally, each block or each step may represent a module, a segment, or some code that includes one or more executable instructions for executing specified logical function(s). Additionally, it should be noted that, in some alternative embodiments, the functions mentioned in blocks or steps are executed out of order. For example, two blocks or steps shown in succession may be performed substantially simultaneously, or the blocks or steps may sometimes be performed in reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for determining a recovery operator using a topological structure of a rotated surface code, the method comprising:
    determining a reliability of n qubits included in the rotated surface code using a belief propagation decoding algorithm, wherein n is an integer of 2 or more;
    setting at least one subset for the n qubits based on the reliability of the n qubits; and
    determining the recovery operator using the at least one subset,
    wherein the setting of the at least one subset includes:
    setting a fix set containing k qubits in an ascending order of values derived through computations on the reliability of the n qubits, wherein k is an integer greater than or equal to 1 and less than n, the k qubits being selected among the n qubits and having a lowest reliability based on a log-likelihood ratio; and
    setting a reset set containing n–k qubits, the n–k qubits being selected among the n qubits and not included in the fix set.

2. The method of claim 1, wherein the determining of the reliability of the n qubits includes determining the reliability based on the log-likelihood ratio derived through the belief propagation decoding algorithm.

3. The method of claim 1, wherein the setting of the fix set includes setting the fix set such that the recovery operator determined from the n-k qubits included in the reset set has a same logical state with reference to the topological structure of the surface code.

4. The method of claim 1, wherein the determining of the recovery operator includes determining the recovery operator based on the log-likelihood ratio derived for the k qubits in the case of the fix set.

5. The method of claim 1, wherein the determining of the recovery operator includes determining the recovery operator corresponding to a syndrome using a pure error determined for the n-k qubits in the case of the reset set.

6. An apparatus for determining a recovery operator using a topological structure of a rotated surface code, the apparatus comprising:
    a memory in which a recovery operator determination program is stored; and
    a processor configured to load the recovery operator determination program from the memory and to execute the recovery operator determination program,
    wherein the processor is configured to:
    determine a reliability of n qubits included in the rotated surface code using a belief propagation decoding algorithm, wherein n is an integer of 2 or more:
    set at least one subset for the n qubits based on the reliability of the n qubits; and
    determine the recovery operator using the at least one subset,
    wherein the processor is configured to:
    set a fix set containing k qubits in an ascending order of values derived through computations on the reliability of the n qubits, wherein k is an integer greater than or equal to 1 and less than n, the k qubits being selected among the n qubits and having a lowest reliability based on a log-likelihood ratio; and
    set a reset set containing n–k qubits, the n–k qubits being selected among the n qubits and not included in the fix set.

7. The apparatus of claim 6, wherein the processor is configured to determine the reliability based on the log-likelihood ratio derived through the belief propagation decoding algorithm.

8. The apparatus of claim 6, wherein the processor is configured to set the fix set such that the recovery operator determined from the n–k qubits included in the reset set has a same logical state with reference to the topological structure of the surface code.

9. The apparatus of claim 6, wherein the processor is configured to determine the recovery operator based on the log-likelihood ratio derived for the k qubits in the case of the fix set.

10. The apparatus of claim 6, wherein the processor is configured to determine the recovery operator corresponding to a syndrome using a pure error determined for the n–k qubits in the case of the reset set.

11. A non-transitory computer-readable storage medium storing a computer program, the computer program including instructions causing a processor to perform, when executed by the processor, a method of determining a recovery operator using a topological structure of a rotated surface code, the method comprising:
- determining a reliability of n qubits included in the rotated surface code using a belief propagation decoding algorithm, wherein n is an integer of 2 or more;
- setting at least one subset for the n qubits based on the reliability of the n qubits; and
- determining the recovery operator using the at least one subset,
- wherein the setting of the at least one subset includes:
- setting a fix set containing k qubits in an ascending order of values derived through computations on the reliability of the n qubits, wherein k is an integer greater than or equal to 1 and less than n, the k qubits being selected among the n qubits and having a lowest reliability based on a log-likelihood ratio; and
- setting a reset set containing n–k qubits, the n–k qubits being selected among the n qubits and not included in the fix set.

12. The non-transitory computer-readable storage medium of claim 11, wherein the determining of the reliability of the n qubits includes determining the reliability based on the log-likelihood ratio derived through the belief propagation decoding algorithm.

13. The non-transitory computer-readable storage medium of claim 11, wherein the setting of the fix set includes setting the fix set such that the recovery operator determined from the n–k qubits included in the reset set has a same logical state with reference to the topological structure of the surface code.

14. The non-transitory computer-readable storage medium of claim 11, wherein the determining of the recovery operator includes determining the recovery operator based on the log-likelihood ratio derived for the k qubits in the case of the fix set.

15. The non-transitory computer-readable storage medium of claim 11, wherein the determining of the recovery operator includes determining the recovery operator corresponding to a syndrome using a pure error determined for the n–k qubits in the case of the reset set.

* * * * *